United States Patent [19]
Arnold et al.

[11] Patent Number: 5,495,956
[45] Date of Patent: Mar. 5, 1996

[54] CRANE ASSEMBLY

[75] Inventors: James K. Arnold; Paul R. Schumacher, both of Newhall, Calif.

[73] Assignee: Lockheed Corporation, Calabasas, Calif.

[21] Appl. No.: 354,575

[22] Filed: Dec. 12, 1994

[51] Int. Cl.[6] .................................................. B66C 19/00
[52] U.S. Cl. .......................... 212/331; 212/316; 212/346
[58] Field of Search ............................ 52/749.1; 212/71, 212/312, 316, 330, 331, 346

[56] References Cited

U.S. PATENT DOCUMENTS

| | | | |
|---|---|---|---|
| 3,106,772 | 10/1963 | Holcombe | 29/429 |
| 3,432,122 | 3/1969 | Flickinger et al. | 244/31 |
| 3,863,771 | 2/1975 | Dobbie et al. | 52/749.1 |
| 4,185,280 | 6/1980 | Wilhelm | 340/685 |
| 4,346,808 | 8/1982 | Garlung et al. | 212/212 |
| 4,420,130 | 12/1983 | Regipa | 244/31 |
| 4,632,617 | 12/1986 | Pechacek et al. | 212/346 |
| 4,641,757 | 2/1987 | Rosendale | 212/346 |
| 4,877,205 | 10/1989 | Rand | 244/31 |
| 5,061,148 | 10/1991 | Petz | 212/346 |

FOREIGN PATENT DOCUMENTS 1093288  11/1967  United Kingdom .................. 212/331

*Primary Examiner*—Michael S. Huppert
*Assistant Examiner*—Thomas J. Brahan
*Attorney, Agent, or Firm*—Louis L. Dachs

[57] ABSTRACT

The invention is a crane system for a building for the assembly of a gas bag for a lighter-than-air vehicle, the building having a floor and a roof thereover with a longitudinal, vertical and lateral axis. In detail, the crane assembly includes a plurality of crane carriage rail assemblies in the form of arches aligned with the lateral axis of and mounted within the building. The carriage rail assemblies are in a spaced relationship along the longitudinal axis. A plurality of crane carriages are movably mounted on each of the crane rail assemblies with each carriage including a winch mounted thereon having an extendible and retractable cable. A control system is provided for moving the crane carriages by rows aligned with the longitudinal axis of the building along the crane carriage rail assemblies to specific locations along the lateral axis and for adjusting the length of the cables of the winches in each of the rows as a function of the distance of each of the rows along the lateral axis of the building.

5 Claims, 8 Drawing Sheets

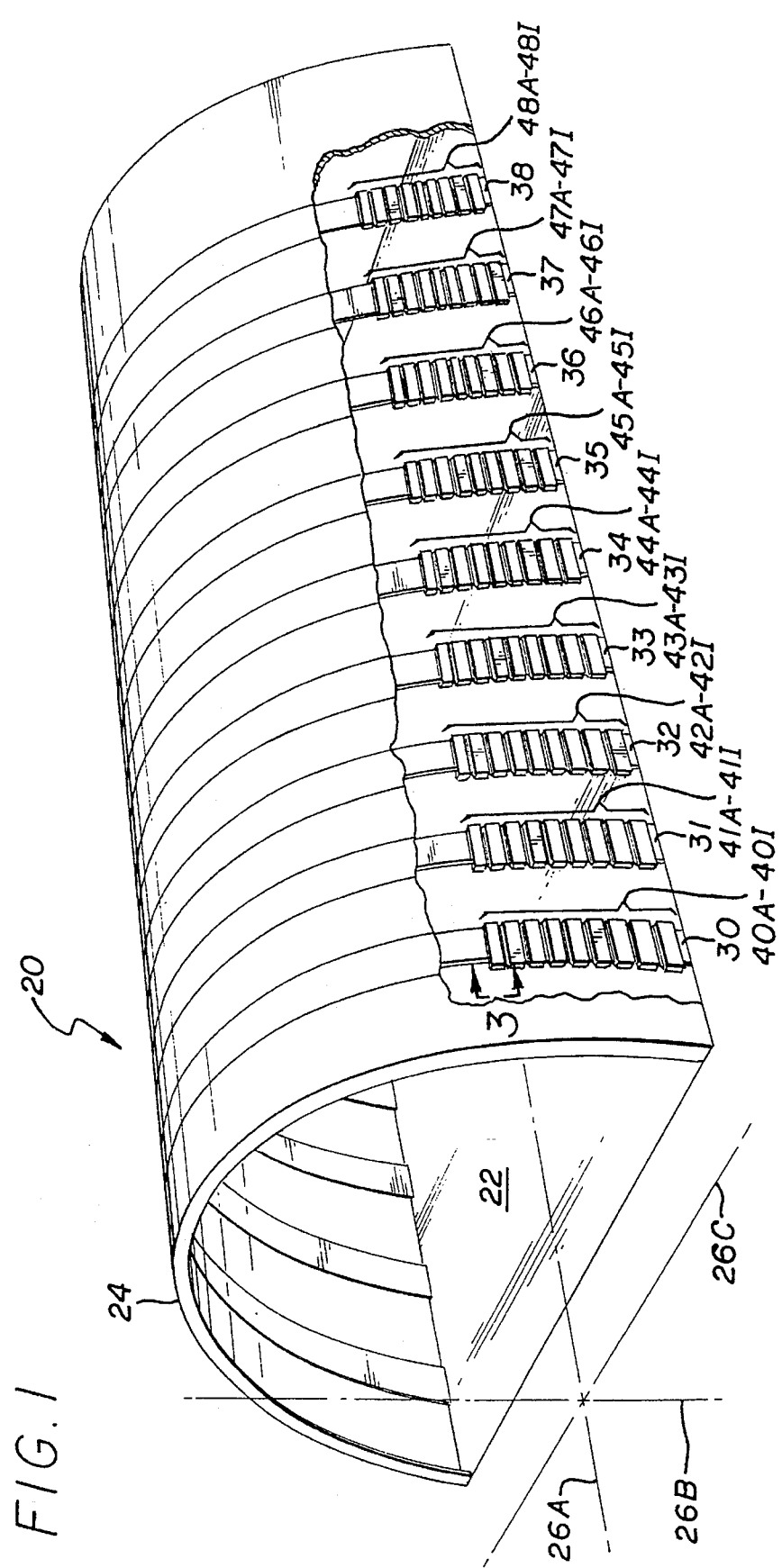

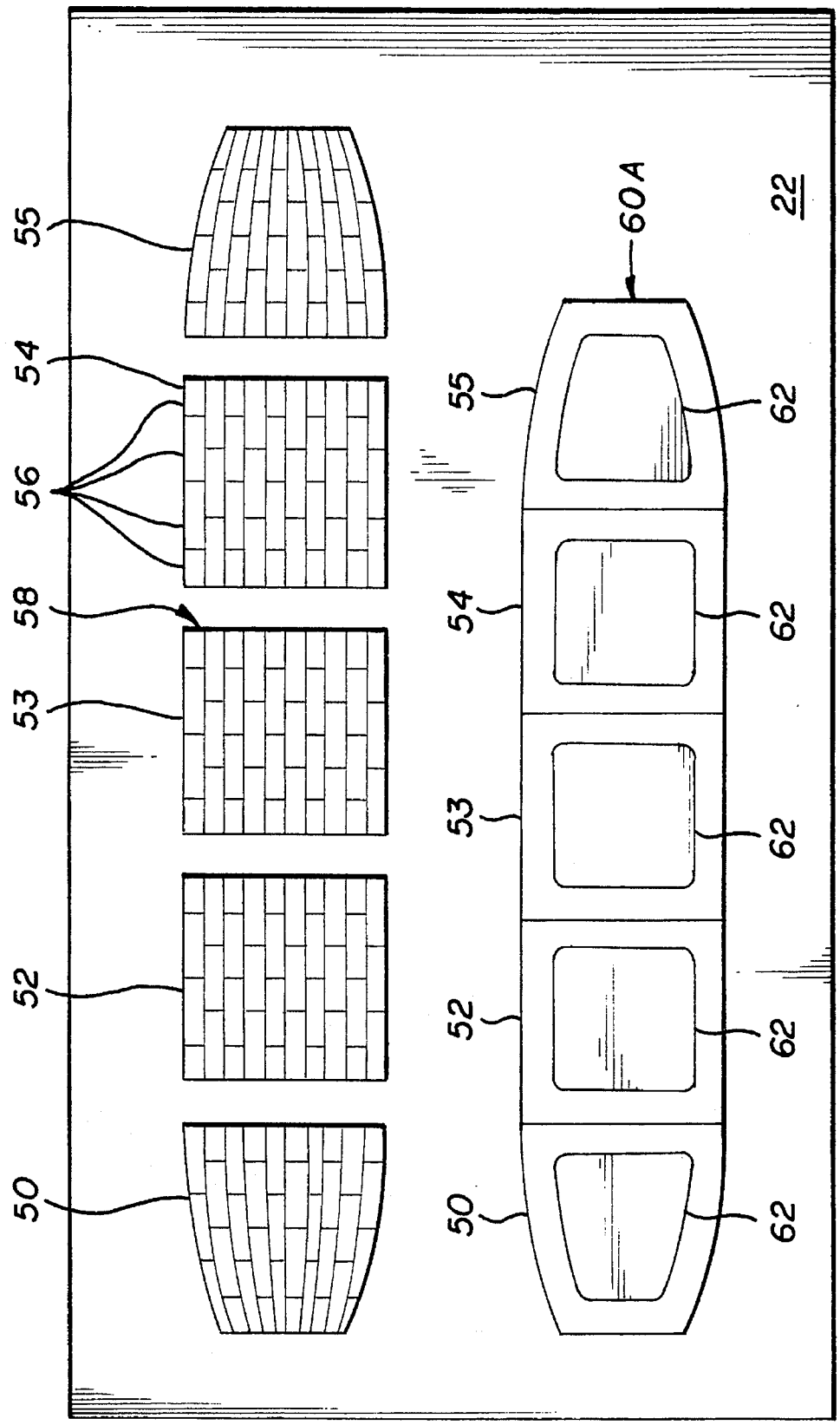

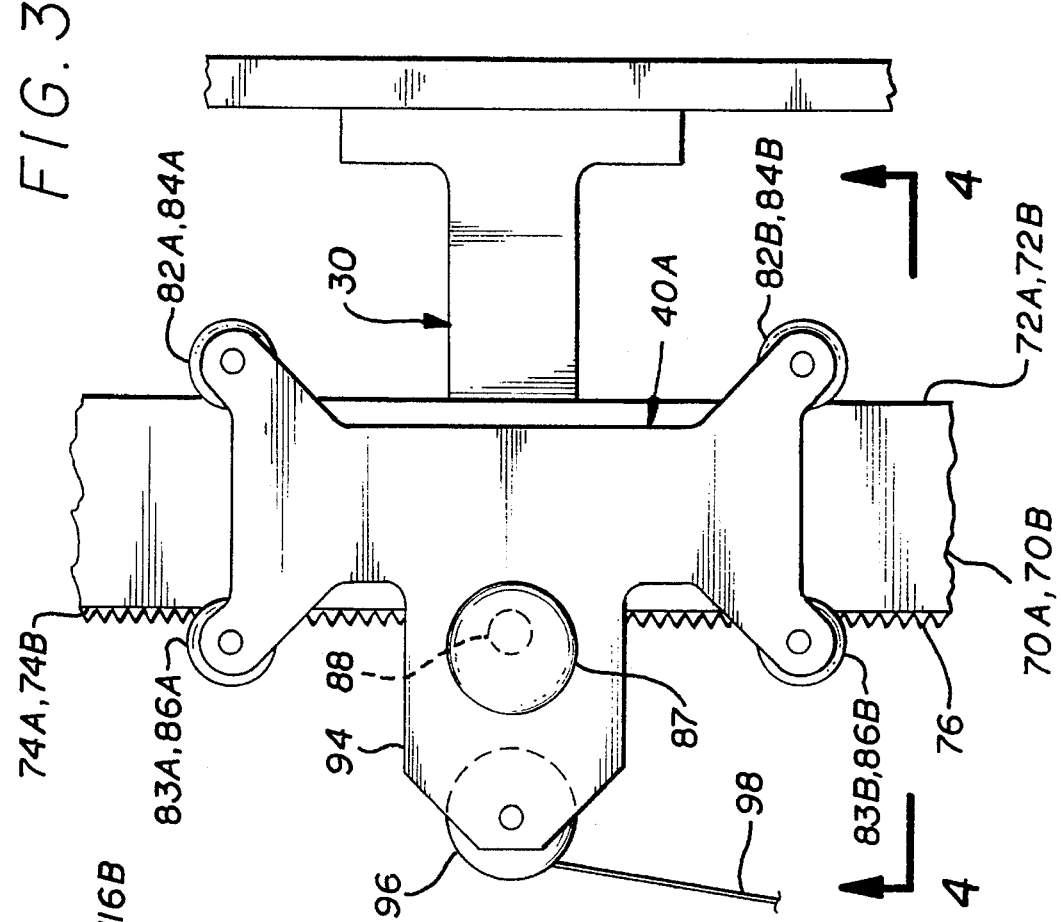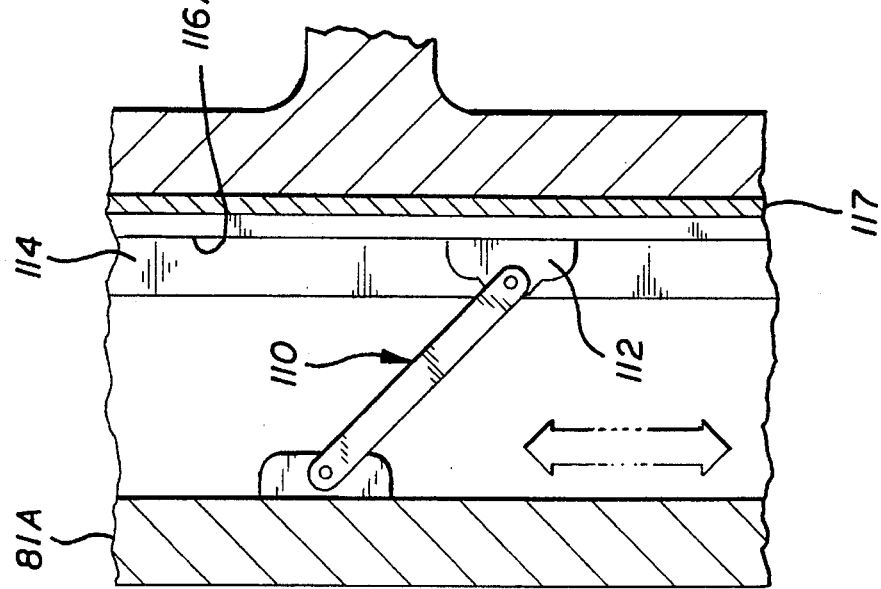

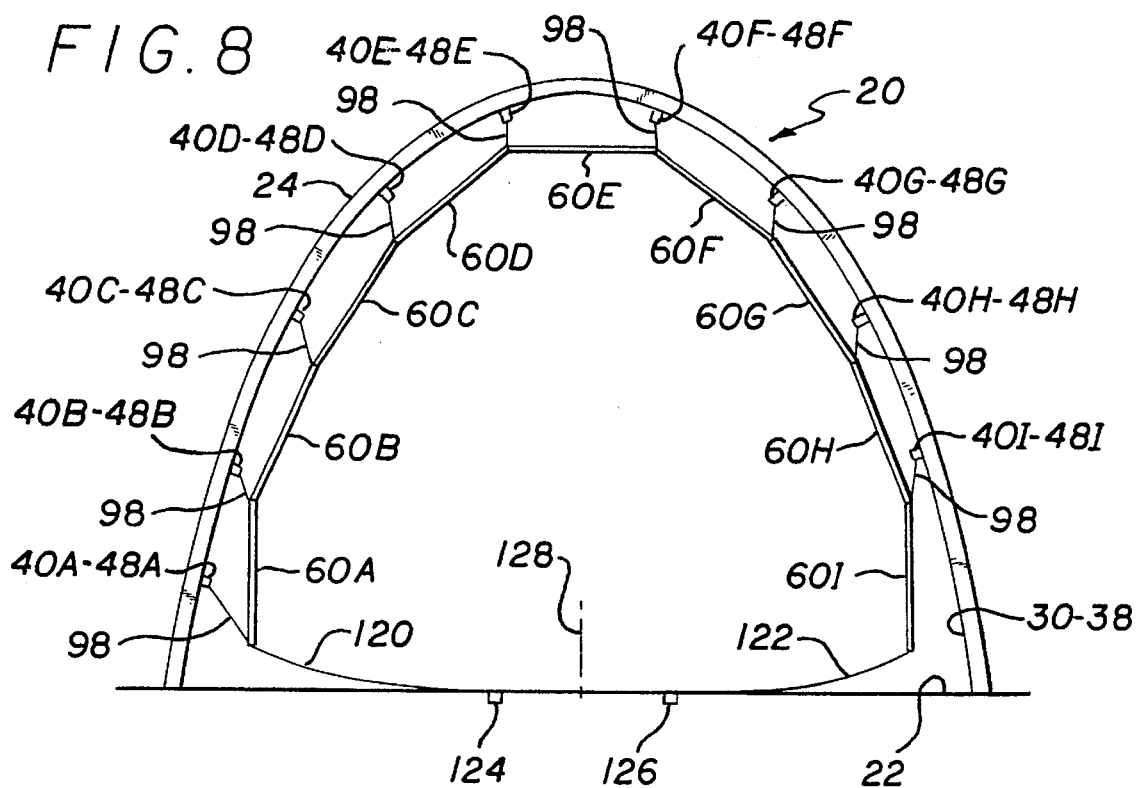
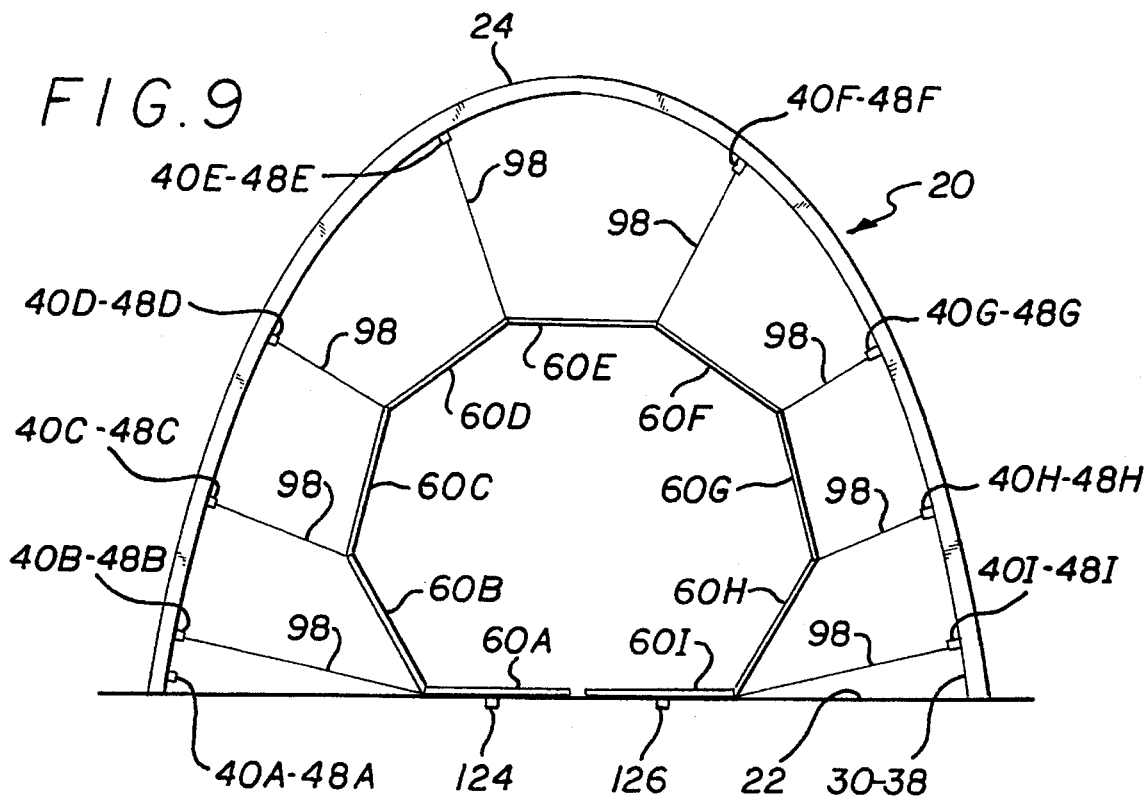

FIG. 11

Z = LATERAL AXIS POSITION OF CRANE
Y = CABLE LENGTH
✓ = ACTIVE FOR PROGRAM

131 LIBRARY TABLE

| POSI-TION PROG. | CRANE CARRIGES ROW 30 ||||||||| 
| --- | --- | --- | --- | --- | --- | --- | --- | --- | --- |
| | 40A | 40B | 40C | 40D | 40E | 40F | 40G | 40H | 40I |
| 1 | ✓ Z= Y= | | | | | | | | |
| 2 | ✓ Z= Y= | ✓ Z= Y= | | | | | | | |
| 3 | ✓ Z= Y= | ✓ Z= Y= | ✓ Z= Y= | | | | | | |
| 4 | ✓ Z= Y= | ✓ Z= Y= | ✓ Z= Y= | ✓ Z= Y= | | | | | |
| 5 | ✓ Z= Y= | ✓ Z= Y= | ✓ Z= Y= | ✓ Z= Y= | ✓ Z= Y= | | | | |
| 6 | ✓ Z= Y= | ✓ Z= Y= | ✓ Z= Y= | ✓ Z= Y= | ✓ Z= Y= | ✓ Z= Y= | | | |
| 7 | ✓ Z= Y= | ✓ Z= Y= | ✓ Z= Y= | ✓ Z= Y= | ✓ Z= Y= | ✓ Z= Y= | ✓ Z= Y= | | |
| 8 | ✓ Z= Y= | ✓ Z= Y= | ✓ Z= Y= | ✓ Z= Y= | ✓ Z= Y= | ✓ Z= Y= | ✓ Z= Y= | ✓ Z= Y= | |
| 9 | ✓ Z= Y= | ✓ Z= Y= | ✓ Z= Y= | ✓ Z= Y= | ✓ Z= Y= | ✓ Z= Y= | ✓ Z= Y= | ✓ Z= Y= | ✓ Z= Y= |
| ETC. | | | | | | | | | |

CRANE ASSEMBLY

BACKGROUND OF THE INVENTION

1. Field of the Invention

The invention relates to the field of overhead crane assemblies for buildings and the like and, in particular, to a crane assembly useful in the manufacture of gas bags for lighter than air vehicles.

2. Description of Related Art

There are basically two types of Lighter-than-air vehicles; rigid or non-rigid. There are three general types of non-rigid vehicles: those comprising a single gas filled bag; several gas bags joined together in series; and, of course, those having a multiple number gas bags within a non-rigid envelope. In non-rigid designs, the flight station and cargo compartments are suspended from the bottom of the vehicle, in what is most often referred to as a gondola.

One of the main problems in the manufacture of large single gas bag non-rigid vehicles occurs during final assembly thereof. The gas bag is typically assembled from rolls of small strips of cloth impregnated with a resin. These strips of cloth are laid out, cut to length and joined to form larger portions of the gas bag. These portions, in turn, are joined to each other to form even larger segments of the gas bag. During this build up process, catenary curtains, doublers, various attachment fittings, and etc. are joined thereto. As larger segments of the gas bag are joined together, such large items as ballonets are joined thereto. Finally one gets to a point wherein the assembled segment has grown so large it covers the entire available floor space of any reasonably sized building. Furthermore, manually handling extremely large segments, for example a segment 800 feet in length and 60 feet in width on a floor is next to impossible. Thus during final assembly, the segments thereof must be raised above the floor to ease final assembly, which involves the seaming of these very large segments together.

Thus it is a primary object of the subject invention to provide an over head crane assembly.

It is another primary object of the subject invention to provide an over head crane assembly for supporting portions of a gas bag for a lighter-than-air vehicle during assembly.

It is a further object of the subject invention to provide an over head crane assembly for supporting portions of a gas bag for a lighter-than-air vehicle during assembly that is computer controlled.

SUMMARY OF THE INVENTION

One of the methods that has been proposed for manufacturing a cylindrical portion of extremely large non-ridged cylindrical gas bags for lighter-than-air vehicles is to heat seam portions of the gas bag until a full length segment of the cylindrical portion of the gas bag is completed. Thereafter, the completed, these large segments would be heat seemed together. As previously mentioned, when the completed cylindrical segments of the gag bag are very large, final assembly becomes difficult. However, by use of the subject crane system, many of the handling problems are eliminated.

The invention is a crane system for a building used for the assembly of a gas bag for a lighter-than-air vehicle, the building having a floor and a roof thereover with a longitudinal, vertical and lateral axis. In detail, the crane assembly includes a plurality of crane carriage rail assemblies in the form of arches aligned with the lateral axis of and mounted within the building. The rail assemblies are in a spaced relationship along the longitudinal axis with each one incorporating a rack gear extending generally along its entire length.

A plurality of crane carriage assembly are movably mounted on each of the rail assemblies with each carriage assembly including a winch mounted thereon having an extendible and retractable cable. A motor is mounted on each of the crane assemblies for driving it over the rail assemblies, preferably by driving a pinion gear in engagement with the rack gear on the rail assembly. A position sensor on the carriage assembly determines its position along the rail assembly. Each carriage assembly includes a cable position sensor. A control system is provided, preferably a computer controlled for moving the carriage assemblies by rows aligned with the longitudinal axis of the building along the rail assemblies to specific locations along the lateral axis. The control system further adjusts the extended length of the cables from the winches in each of the rows as a function of the position of each of the rows of carriage assemblies along the lateral axis.

When the first segment is completed, the winch cables of the first row of carriage assemblies are extended to a preset length and manually attached to the segment via attachment fitting located along its length. The carriage assemblies are then moved to a first position, with a simultaneous adjustment in the length of the cables, lifting the first segment partially off the floor of the building. After a second segment is completed, it is joined to the first segment. The first row of carriage assemblies are moved to a second position raising the first segment completely off the floor. The winch cables of the second row of carriage assemblies are then extended and attached to the second segment. and thereafter the first and second carriage assemblies are moved further along the rails assemblies, with of course, a simultaneous adjustment of the cables. This process is continued until all the segments are joined end to end and lifted of the floor.

At this point, cables from two rows of floor mounted winches are coupled to the free ends of the first and last segments. The free ends of the these segments are then pulled down to the center area of the floor by floor mounted winches as the cables of the winches in the carriage assemblies are readjusted to accommodate the segment movement. Thereafter, the free ends of the first and last segments are joined together to form the cylindrical portion of the gas bag. Thereafter the completed gas bag can be raised completely off the floor for subsequent manufacturing operations. While the gas bag is far from complete, (at this point, end segments have not been joined), the subject crane assembly allows the main section of the gas bag to be easily assembled.

The motors of the crane carriage assemblies, as well as the motors used to adjust cable length, can be easily controlled by means of a microprocessor The micro-processor need only be preprogrammed with library values for the carriage assemblies positions and cable lengths at the various stages of gas bag assembly and provide control signals via motor controllers based on inputs from the position sensors. However, more sophisticated control systems may be used.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of

3 illustration and description only and are not intended as a definition of the limits of the invention.

BRIEF DESCRIPTION OF THE DRAWINGS

FIG. 1 is a simplified perspective view of a building suitable for assembling the gas bag for a lighter-than-air vehicle.

FIG. 2 is a view of the floor of the building shown in FIG. 1 illustrating segments of a gas bag for a lighter than air vehicle in various stages of assembly.

FIG. 3 is a partial side view of one of the crane carriage rail assemblies shown in FIG. 1 taken along the arrow 3.

FIG. 5 is a partial cross-sectional view of the crane carriage rail assembly shown in FIG. 3 taken along the line 5—5.

FIG. 8 is a semi-schematic representation of the subject crane assembly shown in FIG. 6 lifting all the segments of the gas bag off the floor of the building.

FIG. 9 is a semi-schematic representation of the subject crane assembly shown in FIG. 6 wherein the segments of the gas bag are fully joined into the cylindrical portion of the gas bag.

FIG. 11 is a simplified crane position library of positions for a computer suitable for running the control system.

DESCRIPTION OF THE PREFERRED EMBODIMENT

Figure 4:
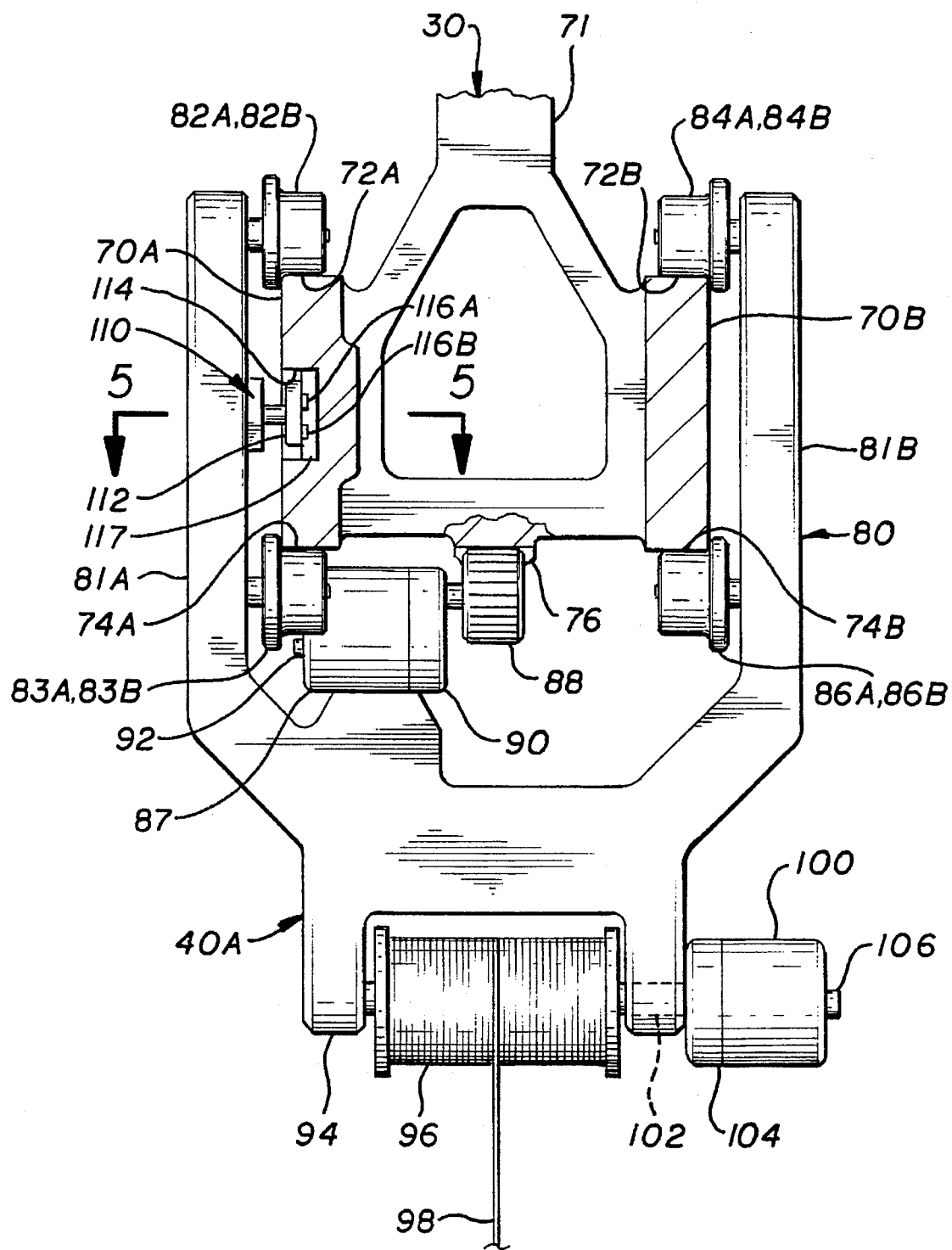
FIG. 4 is a partial cross-sectional view of the crane carriage rail assembly shown in FIG. 3 taken along the line 4—4.

Illustrated in FIG. 1 is a perspective view of the building for the assembly of the gas bag for a lighter than air vehicle, generally designated by numeral 20. The building 20 includes a floor 22, arched roof 24 having a longitudinal axis 26A, vertical axis 26B and lateral axis 26C. The building includes a plurality of crane rail assemblies 30 through 38 with each rail assembly having a plurality of crane carriage assemblies 40A–40I, through 48A–48I.

Referring to FIG. 2, which is a view of the floor 22 of the building 20 shown in FIG. 1, the gas bag is assembled from subsections 50, 52, 53, 54, and 55, which in turn are assembled from individual strips 56 of a composite cloth impregnated with a thermoplastic resin. The strips of cloth 56 are butt joined together to form strips 58 of sufficient length to form the subsections 50–55. The subsections 50–55 are themselves joined together to form a segment 60A which is then moved to the opposite side of the floor. Here the ballonets 62 as well as all other fittings such as catenary curtains, vent ports etc. are added.

All the strips and subsections as well as the completed segments are joined together by a heat seaming process that involves the overlay of reinforcements on the joint and heating under pressure to fuse the resin. To aid in the movement and transfer of subsegments and subsections of the gas bag, the floor incorporates air cushion systems (not shown) such disclosed in U.S. Pat. No. 2,918,183. "Air Cushion Cargo Handling System" by T. K. Peterson, et al. U.S. Pat. No. Pneumatic Conveyor" by D. H. Dennis Of course, there are numerous other systems that can be used. While the segment 60A is being completed, a second segment is being assembled in the vacated space. In large vehicles, the segments 60A can range up to 700 to 800 feet in length and 60 to 100 feet in width. Thus it is readily apparent that the assembly of these segments would normally require an extremely large building. However, by use of the subject crane assembly, the size of the gas bag assembly building can be kept to a reasonable size.

Referring to FIGS. 3 and 4, the crane rail assembly, for example rail assembly 30, includes dual rails 70A and 70B in a spaced relationship supported by a central frame 71, having upper tracks 72A and 72B and lower tracks 74A and 74B. A rack gear 76 is located on the bottom of the frame 71. The crane carriage assembly, for example carriage assembly 40A on rail assembly 30, includes carriage frame 80 having twin support members 81A and 81B. The member 81A supports upper wheels 82A and 82B which ride on track 72A and lower wheels 83A and 83B that ride on track 74A. The member 81B supports upper wheels 84A and 84B which ride on track 72B and lower wheels 86A and 86B which ride on track 74B. Thus the carriage assembly 40A is supported on both sides of the rail assembly 30 and fore and aft. A motor 87 is mounted on the frame 80 that drives a pinion gear 88 via a transmission 90 and, thus drives the carriage assembly 40A along the rail assembly 30. A position sensor 92 mounted to the motor 87 provides carriage assembly position indication along the carriage rail assembly 30. A clevis 94 is mounted at the bottom of the frame 80 that supports a winch 96 having a cable 98. A motor 100 drives the wench via a shaft 102 through a transmission 104. A second position sensor 106 mounted on the motor 100 provides an indication of the position of the end of the cable 98.

Still referring to FIG. 4 and additionally to FIG. 5, electrical power to the carriage assembly 40A is provided by a trolley car type electrical connector 110 which is mounted to the member 81A and has an electrical contact head 112 that rides in a groove 114 and makes contact with conductors 116A and 116B mounted on insulator 117. Not only can power be provided to the motors 87 and 96, but position indication from the position indicators 92 and 106 can be transmitted out.

Figure 6:
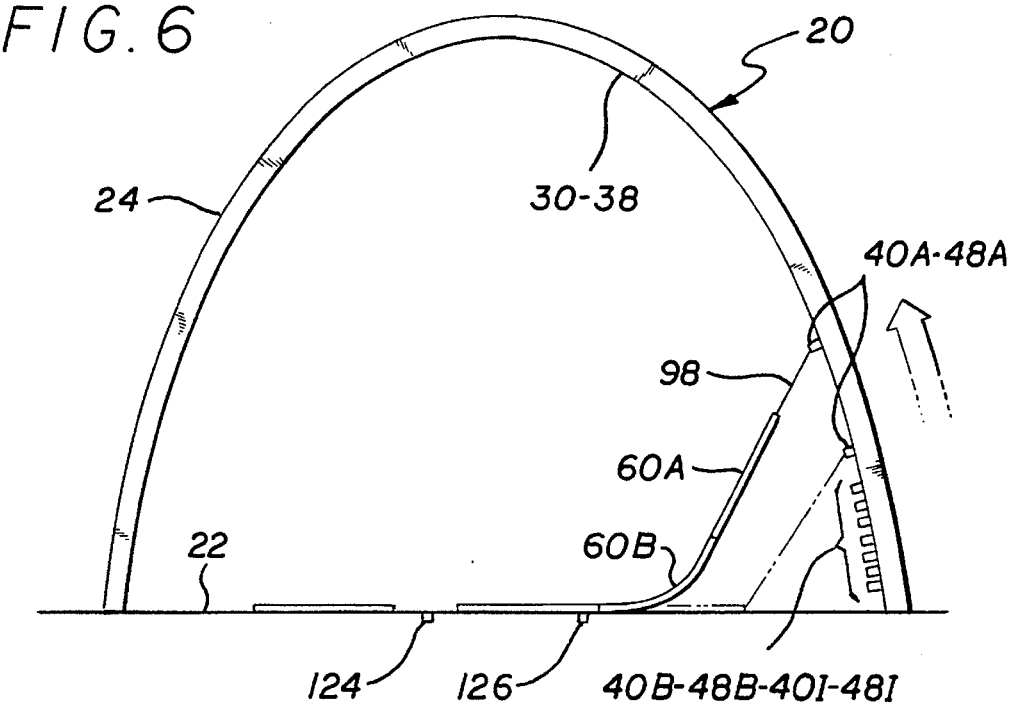
FIG. 6 is a semi-schematic representation of the subject crane assembly lifting the first completed segment off the floor of the building.
Figure 7:
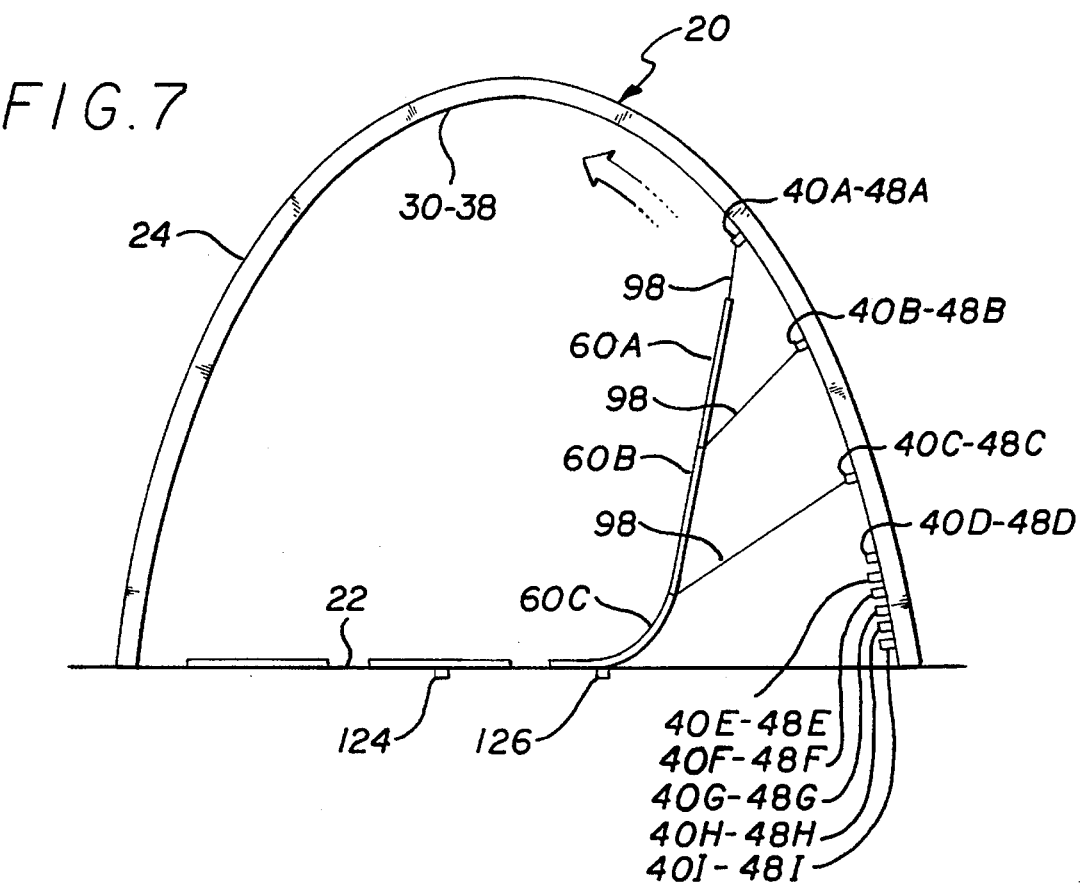
FIG. 7 is a semi-schematic representation of the subject crane assembly shown in FIG. 6 lifting the first three completed segments off the floor of the building.

Referring now to FIGS. 6 and 7, when the first segment 60A is completed, the winch cables 98 of the first row of carriage assemblies 40A through 48A, are extended to a preset length and manually attached to the segment via attachment fittings (not shown) located along its length (shown in dotted lines). The carriage assemblies 40A–48A are then moved to a first position, with a simultaneous adjustment in the length of the cables 98, lifting the segment 60A partially off the floor 22. After a second segment 60B is completed, it is joined to the segment 60A. The carriage assemblies 40A–48A are moved to a second position raising the first segment 60A completely off the floor 22 The winch cables 98 of the carriage assemblies 40B–48B are then extended and attached to the second segment. 60B and thereafter the carriage assemblies 40A–48A and 40B–48B are moved further along the carriage rails 30–38, with a simultaneous adjustment of the cables 98. As illustrated in FIG. 7, segments 60A–C have been completed, with segments 60A and 60B lifted completely of the floor 22 and with segment 60C lifted partially thereof by carriage assemblies 40C–48C.

Referring to FIGS. 8 and 9, the process is continued until all the segments 60A–60I have been completed and joined together end to end and raised off the floor 22. At this point, cables 120 and 122 of floor mounted winches 124 and 126 are coupled to the segments 60A and 60I, respectively. The free ends of the segments 60A and 60I are then pulled down to the center area 128 of the floor 22 by the winches 124 and 126 as the cables 98 of the winches 96 in the carriage assemblies 40A–48A through 40I–48I are readjusted to accommodate the segment movement. Thereafter, the free ends of the segments 60A and 60I are joined together to form the cylindrical portion of the gas bag. Thereafter the completed gas bag can be raised completely off the floor 22 for subsequent manufacturing operations. While the gas bag is far from complete, (at this point, end segments have not been joined), the subject crane assembly has allowed the main section of the gas bag to be easily assembled.

Figure 10:
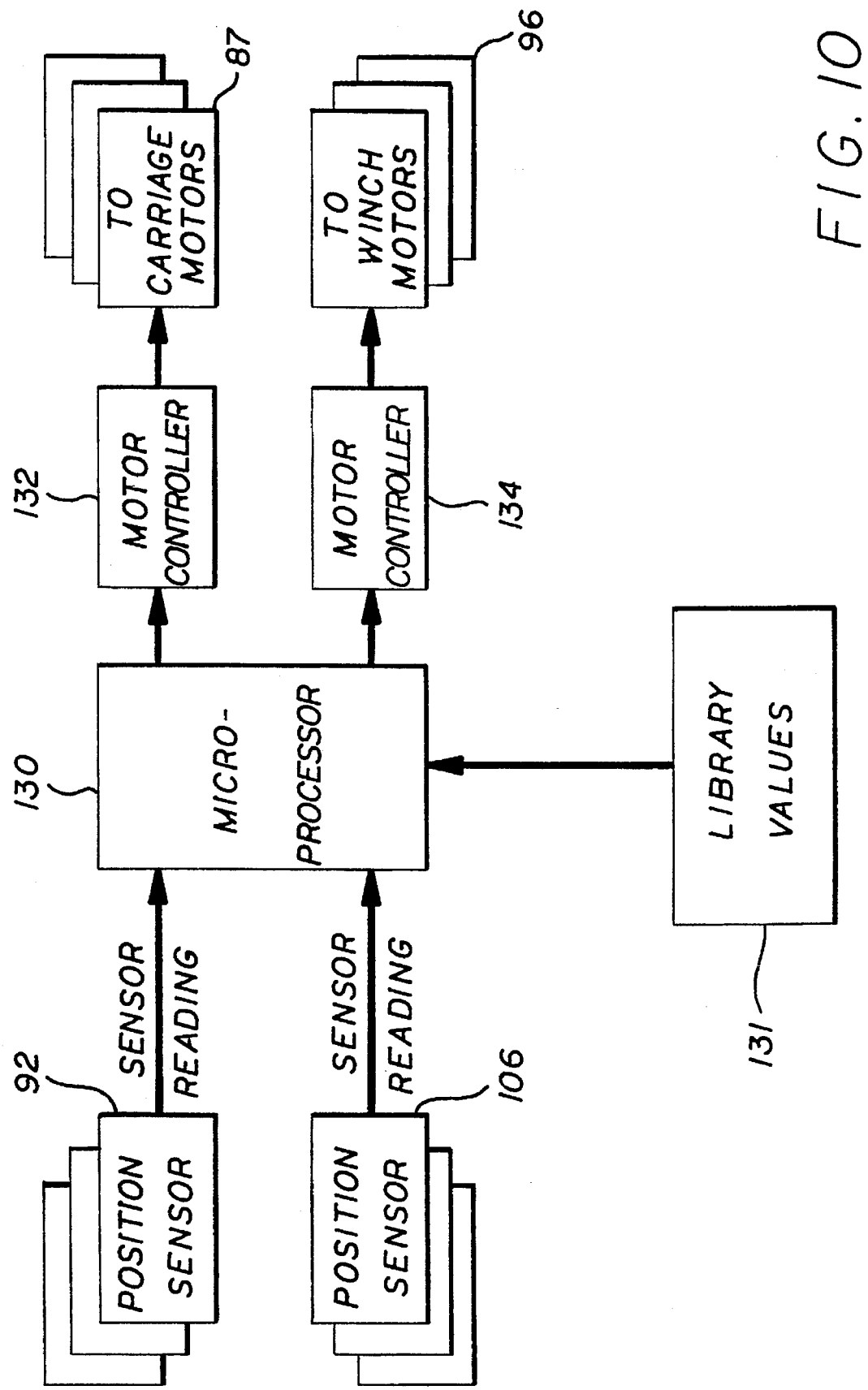
FIG. 10 is a block diagram of the control system for the crane assembly.

Referring to FIGS. 10, it can be seen that the motors 87 of crane carriage assemblies 40A–I through 48A–I, as well as the motors 96 used to adjust cable 98 length, can be easily controlled by means of a micro-processor 130. The micro-processor 130 need only be preprogrammed with library values 131 shown in FIG. 11, for the their respective positions at the various stages of gas bag assembly and provide control signals via motor controllers 132 and 134 based on inputs from the position sensors 92 and 106. However, more sophisticated control systems may be used.

While the invention has been described with reference to a particular embodiment, it should be understood that the embodiment is merely illustrative as there are numerous variations and modifications which may be made by those skilled in the art. Thus, the invention is to be construed as being limited only by the spirit and scope of the appended claims.

INDUSTRIAL APPLICABILITY

The invention has applicability to the aircraft construction industry.

We claim:

1. A crane system for a building for the assembly of a gas bag for a lighter-than-air vehicle, the building having a floor and a roof thereover with a longitudinal, vertical and lateral axis, the crane assembly comprising:

a plurality of crane carriage rail assemblies in the form of arches aligned with the lateral axis of and mounted within the building, said carriage rail assemblies in a spaced relationship along the longitudinal axis;

a plurality of crane carriages movably mounted on each of said crane rail assemblies;

a winch mounted on each crane carriage, having an extendible and retractable cable; and a control system for moving said crane carriages by rows aligned with the longitudinal axis of the building along said crane carriage rail assemblies to specific locations along the lateral axis and for adjusting the length of said cables of said winches in each of said rows as a function of the distance of each of said rows along the lateral axis of the building.

2. The crane system as set forth in claim 1 wherein said control system further simultaneously adjusts the length of said cables of said winches as said rows of said crane carriages are moved along said crane rail assemblies.

3. The crane system as set forth in claim 2 comprising:

each of said crane carriage rail assemblies having a rack gear; and each of said crane carriage assemblies including:
a motor mounted on said crane assembly, said motor having a pinion gear engaged with said rack gear; and
position indication means for determining the position of said crane assembly along said crane rail assembly.

4. The crane system as set forth in claim 3 comprising:

a motor coupled to each of said winches for driving same: and position indication means coupled to each of said winches for determining the position of the end of said cable.

5. The crane assembly as set forth in claim 4 wherein said control system is a computer.

* * * * *